United States Patent [19]

Araki et al.

[11] Patent Number: 4,670,794
[45] Date of Patent: Jun. 2, 1987

[54] ELECTRONIC PRINT BOARD

[75] Inventors: Seiji Araki; Joji Tadokoro, both of Tokyo, Japan

[73] Assignee: Oki Electric Industry Co., Ltd., Tokyo, Japan

[21] Appl. No.: 739,460

[22] Filed: May 30, 1985

[30] Foreign Application Priority Data

Jun. 4, 1984 [JP] Japan .................. 59-114340

[51] Int. Cl.⁴ .............................. H04N 1/10
[52] U.S. Cl. .................... 358/293; 358/285; 358/291; 434/411; 434/412; 434/416; 434/428
[58] Field of Search ............... 358/289, 291, 292, 293, 358/285, 294, 256; 434/428, 408, 409, 411, 412, 413, 416, 426, 427, 429, 430, 433; 280/578, 563, 559

[56] References Cited

U.S. PATENT DOCUMENTS

| 2,989,586 | 6/1961 | Beck et al. | 358/293 |
|---|---|---|---|
| 3,483,511 | 12/1969 | Rabinow | 358/293 |
| 3,867,569 | 2/1975 | Watson | 358/293 |
| 3,974,506 | 8/1976 | Starkweather | 358/293 |
| 4,107,740 | 8/1978 | Cooley | 358/293 |
| 4,143,403 | 3/1979 | Ohnishi | 358/293 |
| 4,196,452 | 4/1980 | Warren et al. | 358/293 |
| 4,219,850 | 8/1980 | Howard | 358/293 |
| 4,449,152 | 5/1984 | Karata et al. | 358/293 |
| 4,486,787 | 12/1984 | Gocho et al. | 358/213 |
| 4,587,568 | 5/1986 | Tokayama et al. | 358/293 |

FOREIGN PATENT DOCUMENTS 59-111462  6/1984  Japan .

Primary Examiner—Edward L. Coles, Sr.
Attorney, Agent, or Firm—Wenderoth, Lind & Ponack

[57] ABSTRACT

An electronic print board is provided with an endless or continuous writing medium, on which a transparent sheet-shaped writing medium (3) is removably mounted. Any characters and figures written on both the writing media are combined, scaled down, and copied on recording paper by means of a recording device. In addition, another document can be inserted between the two writing media. Thus, the characters and figures written on the document and the transparent writing medium can be combined, scaled down, and copied on the recording paper by means of the recording device.

4 Claims, 5 Drawing Figures

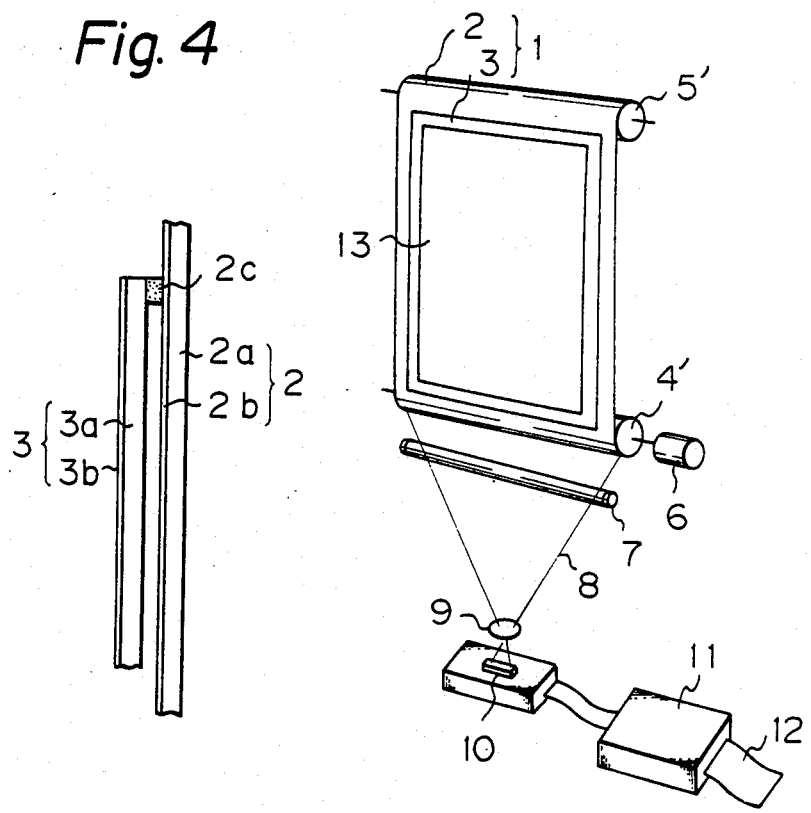

ELECTRONIC PRINT BOARD

BACKGROUND OF THE INVENTION

1. Field of the Invention

The present invention relates to an electronic print board provided with an endless write medium.

2. Description of the Related Art

A prior electronic print board is disclosed in U.S. Ser. No. 588,548, now U.S. Pat. No. 4,587,568, by the present applicant.

An electronic print board is used in conferences, explanation meetings, and preliminary meetings, etc.

The electronic print board is capable of writing thereon various results yielded with the progress of a conference, contents of a preliminary arrangement, or information such as symbols and figures and the like, and display them for the participants.

These pieces of information are written on a large-sized writing medium equipped with a scene movable by a roller using a writing tool such as an aqueous felt pen. In addition, such pieces of information can be scaled down onto recording paper, copied on the required number of sheets, and distributed to the participants.

The electronic print board is provided with a very effective function capable of recording a picture image which has been already written on a writing medium on recording paper on the required number of copies as described before. But, it is difficult to say at present that the electronic print board is sufficiently demonstrating its function, thus presenting the possibilities of more versatile uses thereof as problems remained for future development.

SUMMARY OF THE INVENTION

It is an object of the present invention to extend the uses of the electronic print board to more versatile fields based on the above-description.

According to the present invention, the above objects can be achieved by a large-sized writing medium comprising an opaque parent sheet and a transparent sheet removable with respect to said parent sheet. The transparent sheet described above is formed by a raw material at least capable of allowing a picture image to be erasable written thereon.

According to the device described above, it is possible not only to write a picture image on a parent sheet or a transparent sheet constituting a writing medium by means of a writing tool and to record it on recording paper, but also to scale down onto recording paper a picture image which has been previously written on a large-sized document by handwriting or printing by inserting said document between the parent and transparent sheets.

In addition, it is also possible to record any document such as a map or the like on recording paper after the insertion thereof between the parent and transparent sheets and the addition of any picture from the upper of the transparent sheet.

Further, according to the present invention, it is possible, besides its ordinary uses, to scale down a large-sized map and a design drawing onto recording paper, and record any document such as a map and a music sheet on recording paper as a picture image after its insertion between parent and transparent sheets and further its correction from the upper of the transparent sheet, thus leading to more versatile applications of the electronic print board.

BRIEF DESCRIPTION OF THE DRAWINGS

The foregoing and other objects, features, and attendant advantages of the present invention will be appreciated as the same become better understood by means of the following description and accompanying drawings wherein:

FIG. 4 is a partially enlarged side elevational view of a writing medium, and FIG. 5 is a perspective view of a portion of another embodiment.

DETAILED DESCRIPTION OF THE PREFERRED EMBODIMENT

Figure 1:
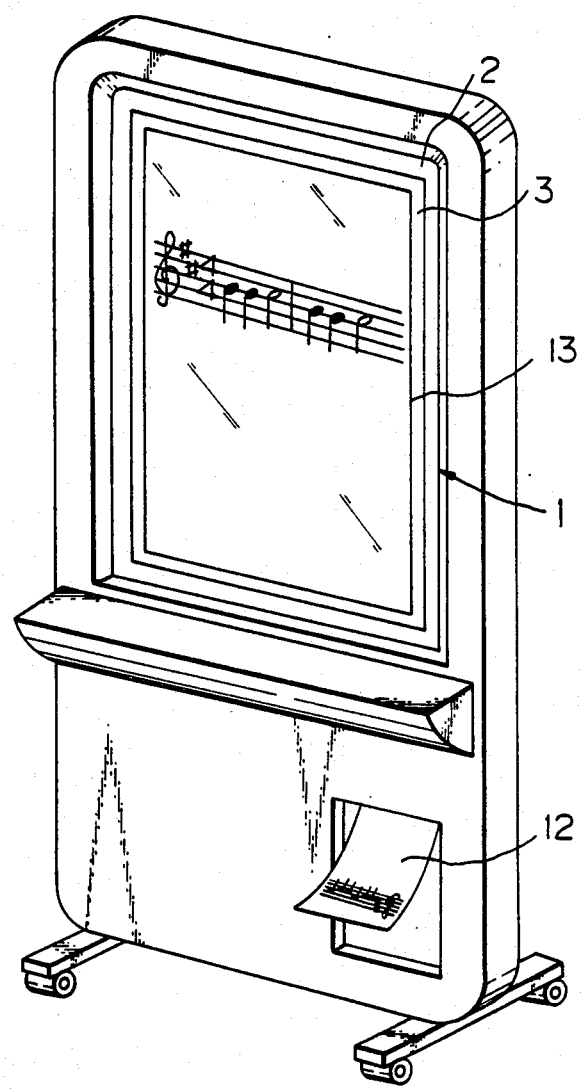
FIG. 1 is a perspective view showing an embodiment of an electronic print board.

According to FIGS. 1 through 4, a first embodiment is described. FIG. 1 illustrates a body of an electronic print board mounted on a housing. Designated by reference numeral 1 in the figure is a large-sized writing medium constructed by an endless parent sheet 2 and a rectangular parent sheet 3. The transparent sheet 2 is, as illustrated in FIG. 4, formed by arranging a surface film 2b on a semitranslucent opaque substrate film 2a and joining them, while the transparent film 3 is constructed by arranging a surface film 3b on a transparent substrate film 3a and joining them. Here, for the substrate film 2a of the parent sheet 2, a whitened polyester film, etc., can be preferably used. In the same way, for the substrate film 3a of the transparent sheet 3, a transparent polyester film, and for the surface films 2b, 3b, a fluorine film facilitated to be erasably written thereon by a writing tool such as a felt pen and cloth, etc., can be used. In the present invention, the parent sheet 2 is trained around a driving roller 4 and a supporting roller 5 arranged in parallel to each other and spaced by a prescribed interval, and is moved in circulation by rotating the driving roller 4 by a motor 6.

By contrast, the transparent sheet 3 is sized to correspond to one screen of the writing medium. The sheets 3 are detachably and reattachably arranged respectively on the two planes of the parent sheet 2 between the rollers 4 and 5. Namely, the transparent sheet 3 is made mountable/demountable on/from the parent sheet 2 using as a means therefor a mounting means 2C such as an adhesive or a magic fastener Accordingly, the writing medium 1 in the present invention provides two screens A and B each from the parent sheet 2 and the transparent sheet 3, and these screens can be alternated with each other to be exposed ahead of the device by moving the writing medium 1 by the motor 6.

Figure 2:
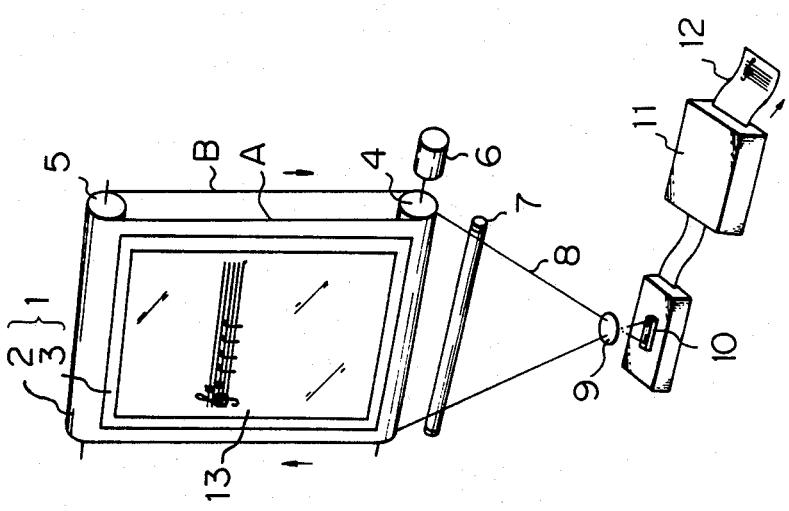
FIG. 2 is a perspective view of a portion of the internal structure of the electronic print board of FIG. 1.

Designated by reference numeral 7 in FIG. 2 is a fluorescent lamp being a light source. Also designated are a beam of light 8, a lens 9, a readout sensor 10, a recording device 11 equipped with a thermal head, and recording paper 12. These are equivalent to those described in the aforementioned application U.S. Ser. No. 588,548. Designated by reference numeral 13 is a document such as one handwritten or printed onto which a picture image has been previously written.

Figure 3:
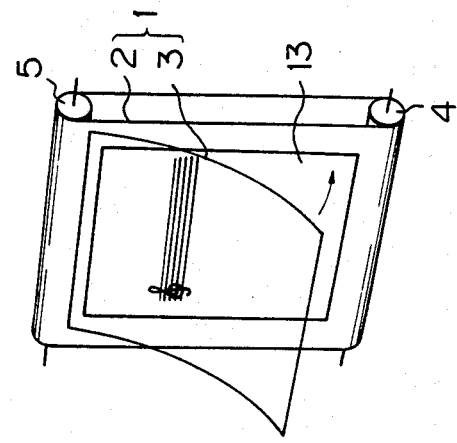
FIG. 3 is a perspective view further illustrating a portion of FIG. 2.

Operation of the above device is described below. First, upon writing a picture image such as characters, numerals, symbols, and patterns, etc., on the writing medium 1 and recording it on the recording paper 12, the transparent sheet 3 is removed from the parent sheet 2, the the picture image is written by a writing tool such as a felt pen. After the completion of the writing, the movement of the writing medium 1, i.e., the parent sheet 2 toward the lamp 7 by the rotation of the driving roller 4 by the motor 6 causes a light illuminated by the fluorescent lamp 7 to be, forming a beam of light 8, to be reflected off the writing medium 1 and projected onto the readout sensor 10 through the lens 9, thereby projecting a reduced scale image to read sensor 10. A readout picture image formed by the sensor 10 is provided to recording device 11 where it is recorded on the recording paper 12 by the recording device 11, and the recording paper 12 is then sent out from the device. Although the operation described above is the same as that of a conventional electronic print board, the present invention can further provide the following remarkable functions. Namely, as shown in FIG. 3, the upper side of the transparent sheet 3 is mounted on the parent sheet 2 of the writing medium 1 by the adhesive or detachable means 2c such as a magic fastener, etc., and a document 13 is held between the parent sheet 2 and the transparent sheet 3. Thereafter, as shown in FIG. 2, the lower side of the transparent sheet 3, and both right and left sides thereof are mounted on the parent sheet 2 by the detachable means. In this case, the contents previously handwritten or printed on said document 13 can be similarly read out as in the description and recorded on the recording paper 12. Thus, it is made possible, in case of the document 13 being a large-sized map or a musical sheet or a design drawing or the like, to simply scale down and record it.

Further, it is also possible to hold said map or musical sheet of a schedule in which only dates have been previously written, etc., between the parent sheet 2 and the transparent sheet 3, and add any symbol, musical note, scheduled item and the like thereto from the upper of the transparent sheet 3 and further record it on the recording paper 12 as a picture image, enabling the document 13 to be repetitively employed any number of times since the document 13 has not yet even directly corrected.

Moreover, the present invention can be subjected to various modifications without any limitation to the aforementioned embodiment. For example, although in the embodiment described above, it is made possible for a picture image to be erasably written on the parent sheet 2, it is also possible to use parent sheet 2 for merely mounting the transparent sheet 3. Namely, the same effect can be attained by using, as the parent sheet 2, only the substrate film 2a such as whitened polyester or the like. In that case, the transparent sheet 3 is made to be always mounted on the substrate film 2a via a removing means, and upon ordinary use thereof a picture image is erasably written on the transparent sheet 3, and upon use of a document 13 it is held between it and said substrate film 2a. Thus, a function for erasably writing a picture image may be provided only by the transparent sheet 3.

FIG. 5 illustrates another embodiment.

Moreover, in the embodiments described above the whole of the writing medium 1 was made endless, but a long material may be also used. In that case, one of the two rollers 4', 5' may be made to deliver the writing medium and the other to wind it.

In addition, although the writing medium 1 was longitudinally moved as shown in an embodiment in which the medium 1 is moved figure, the transversely may be also allowed.

Still more, although the embodiments described above were constructed to read out a picture image by the readout sensor 10 and to record it on the recording paper 12 by means of the recording device 11 equipped with a thermal head, it may be also possible instead of the use of such a recording means to employ an electronic photography system recording means.

What is claimed is:

1. An electronic print board, comprising:

a housing having an opening formed therein;

a driving roller and a supporting roller rotatably mounted to said housing;

an opaque parent sheet formed of a material receptive of picture images which are easily erased therefrom, trained over said driving roller and said supporting roller so as to be movable by said driving roller on said housing;

a transparent sheet on said parent sheet, said transparent sheet being formed of a material receptive of picture images which are easily erased therefrom;

means, including a light source and a lens, for reflecting light from said light source off of said writing medium and through said lens to form a reduced scale image of a combined picture image on said parent sheet and said transparent sheet, said parent sheet and transparent sheet being exposed to the reflected light through said opening;

a readout sensor, disposed so as to receive said reduced scale image, said sensor including means, responsive to said reduced scale image, for providing a readout picture image;

recording means, connected to said readout sensor and responsive to said readout picture image, for recording a picture image on a recording paper; and means for detachably and reattachably attaching said transparent sheet on said parent sheet, said transparent sheet including means for releasable holding a document between said transparent sheet and said parent sheet so that the light from said light source is reflected off of a combined picture image formed of a picture image on said transparent sheet and a picture image on the document.

2. An electronic print board, comprising:

a housing;

a driving roller and a supporting roller rotatably mounted to said housing;

an opaque parent sheet trained over said driving roller and said supporting roller so as to be movable by said driving roller and said housing;

a transparent sheet on said parent sheet, said transparent sheet being formed of a material receptive of picture images which are easily erased therefrom;

means, including a light source and a lens, for reflecting light from said light source off of said parent sheet and said transparent sheet and through said lens to form a reduced scale image of a combined picture image on said parent sheet and said transparent sheet;

a readout sensor, disposed so as to receive said reduced scale image, said sensor including means, responsive to said reduced scale image, for providing a readout picture image, recording means, connected to said readout sensor and responsive to said readout picture image, for recording a picture image on a recording paper; and means for detachably and reattachably attaching said transparent sheet to said parent sheet, said transparent sheet including means for releasable holding a document between said transparent sheet and said parent sheet so that the light from said light source is reflected off of a combined picture image formed of a picture image on said transparent sheet and a picture image on the document.

3. An electric print board as in claim 2, wherein said transparent sheet is receptive of and permits easy erasure of picture images formed with a felt pen.

4. An electronic print board according to claim 2, wherein said writing medium is endless.

* * * * *